J. SEADLER.
TIRE.
APPLICATION FILED SEPT. 25, 1916.

1,249,284.

Patented Dec. 4, 1917.
2 SHEETS—SHEET 1.

WITNESSES:
Lincoln Johnson
Charles Pickles

INVENTOR
James Seadler.
BY Strong & Townsend
ATTORNEYS

J. SEADLER.
TIRE.
APPLICATION FILED SEPT. 25, 1916.
1,249,284.
Patented Dec. 4, 1917.
2 SHEETS—SHEET 2.
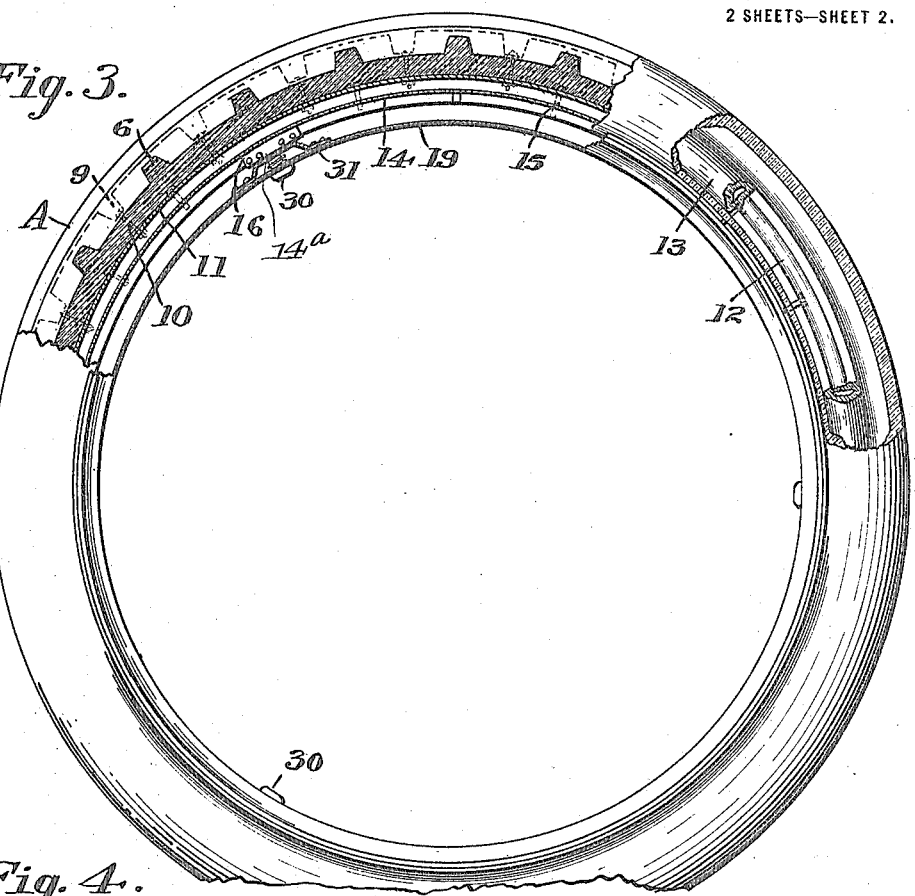
Fig. 3.
Fig. 4.
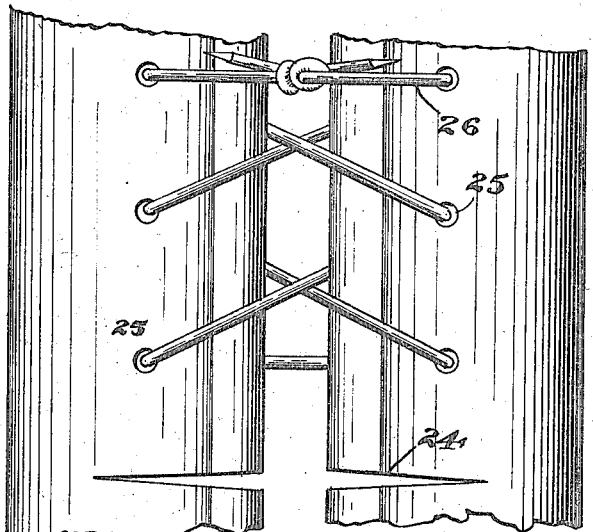
WITNESSES:
INVENTOR
James Seadler
BY Strong & Townsend,
ATTORNEYS

UNITED STATES PATENT OFFICE.

JAMES SEADLER, OF SACRAMENTO, CALIFORNIA.

TIRE.

1,249,284. Specification of Letters Patent. Patented Dec. 4, 1917.

Application filed September 25, 1916. Serial No. 121,974.

*To all whom it may concern:*

Be it known that I, JAMES SEADLER, a citizen of the United States, residing at Sacramento, in the county of Sacramento and State of California, have invented new and useful Improvements in a Tire, of which the following is a specification.

This invention relates to a vehicle tire and particularly to a core tire or filler which is adapted to be placed interior of an ordinary casing.

One of the objects of the present invention is to provide a simple, durable core tire or filler adapted to be placed interiorly of an ordinary casing or tread and which will afford the desired degree of resiliency and be the equivalent in function of a standard inflated tire. Another object of the invention is to provide a core tire or filler which is puncture proof and in conjunction therewith a pair of metal rings which will secure the casing and core tire together and also permit the tire as a whole to be applied to any standard form of demountable rim. Further objects will hereinafter appear.

The invention consists of the parts and the combination and construction of parts as hereinafter more fully described and claimed, having reference to the accompanying drawings, in which—

Fig 3 is a side elevation of the tire partly in section.

Fig. 4 is an interior view of an ordinary tire casing showing it cut and perforated to receive the lacing.

Figure 1:
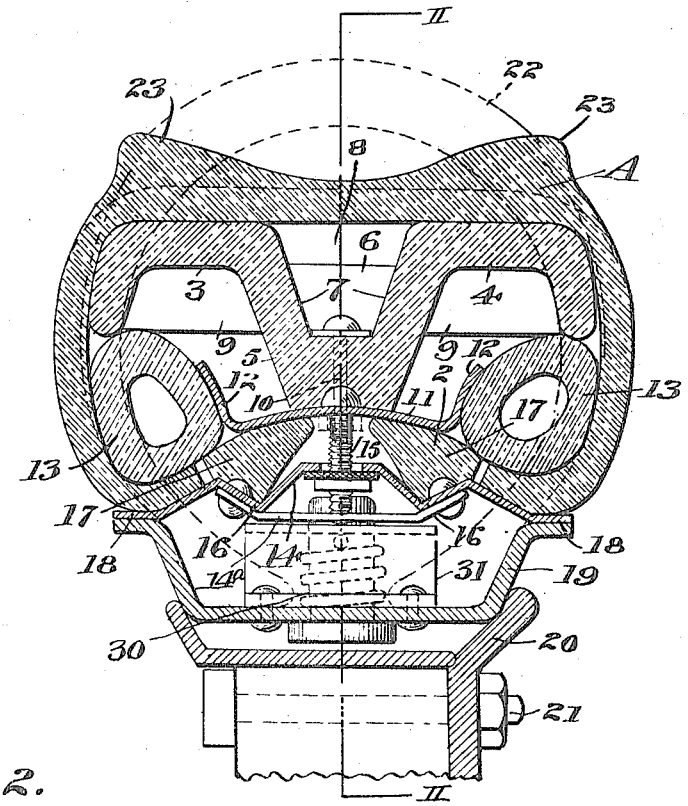
Figure 1 is a cross section of an ordinary casing on line 1—1 of Fig. 2 showing the application of the invention.

Referring to the drawings in detail, A indicates the tread portion of an ordinary tire casing, and 2 the lower clencher edges. Adapted to be placed interior of the casing is a core tire or ring which consists of two annular L-shaped sections 3—4. These sections are connected together at their inner edges by an annular continuous web 5 while the upper inner edges are connected at intervals by cross-webs 6. They are furthermore spaced apart or angularly projected as indicated at 7 to form a continuous annular channel 8 across which the connecting webs 6 extend at intervals, and each section 3—4 is in turn reinforced and connected with the inner side sections 7 by inter-spaced cross webs 9.

Secured to the annular inner base section 5 of the core tire by means of bolts 10 is a metal ring 11, the outer edges of which are turned up to form annular flanges 12. Interposed between the flanges 12 and the sides of the exterior tire casing A is a pair of tubular rings 13 and adapted to secure the casing, the core tire, the metal ring 11 and the tubular members 13 together as a unitary structure, is an annular metal clamping ring 14. This ring is secured to the inner ring 11 by means of bolts 15, and is provided with a pair of annular grooves 16 which are shaped to receive the clenchers 17 on the tire casing. The outer edges of the ring 14 are otherwise flattened as at 18 to form a seat for the tire structure as a whole.

Any simple form of demountable rim, or the one indicated at 19, may be employed to secure the tire structure to the felly of a wheel; said rim being secured by locking lugs 20 and bolts 21.

The tire structure or filler here employed is particularly adapted for use in connection with an old or worn tire casing, such as shown in Fig. 1. The casing ordinarily employed assumes the inflated or extended position indicated by dotted lines as at 22, see Fig 1. The tread portion of the tire is in this manner gradually worn down until the outer central wearing or tread surface is practically worn away. A pair of annular ridges 23 containing considerable rubber and consequently wearing surface still remains on the casing and may therefore be used to great advantage when the core tire or filler here shown is employed.

In actual operation when it is desired to fit a worn casing for the use here shown, it is first necessary to slit the clencher beads in several places as indicated at 24, see Fig. 4. These slits may be spaced eight inches apart for instance, and are provided for the purpose of permitting the tire to be expanded to fit the larger diameter of the ring 14. The clencher beads are then perforated along each side as at 25 between each slitted section to permit a lacing 26 to be applied as will hereinafter be described. The core tire with the ring 11 bolted thereto is next placed within the casing to assume the position shown in Fig. 1. The tubular rings are then inserted and the clencher beads are then bent inwardly and temporarily secured together by the lacing indicated at 26. An individual lacing string is applied between each slitted section and therefore permits each section to be successively laced and gradually tightened to draw the sides of the casing A against the tubular members 13, and the side flanges 12 of the ring 11.

The tire structure thus assembled is finally completed by applying the clamping ring 14. This as previously described, is secured to the ring 11 by means of bolts 15 and as these are gradually tightened it can readily be seen that the clencher beads will be securely clamped between the rings 11 and 14. The tire may now be placed on the demountable rim and is here locked against peripheral movement by means of a plurality of radially disposed spring-actuated locking bolts 30; the ordinary clamping lugs and bolts 21 being finally applied to secure the tire and rim from lateral movement with relation to the felly of the wheel. The locking bolts 30 are carried by the rim 19 and are secured therein by brackets 31 which are applied for this purpose and through which the bolts 30 pass and into the plates 14ª which are secured to ring 14, as in Figs. 1 and 2.

The method of attaching the rim 19 is not changed in any manner, and will therefore not necessitate a reconstruction of the demountable structure.

An old and worn tire casing mounted and filled with a core tire constructed as here shown is to all practical purposes as resilient as an ordinary inflated casing. The annular ridges 23 left when the center portion is worn away provides a new wearing surface and any pressure applied on these points is transmitted to the sections 3—4 of the inner core tire which in turn are supported by the tubular rings 13, and the connecting webs 6 and 9. The resiliency thus secured is practically the same as that secured by an ordinary pneumatic tire and as the structure as a whole may be punctured without decreasing the resiliency or impairing the structure, it can readily be seen that the exterior casing may be practically worn through before it is necessary to discard it.

Figure 2:
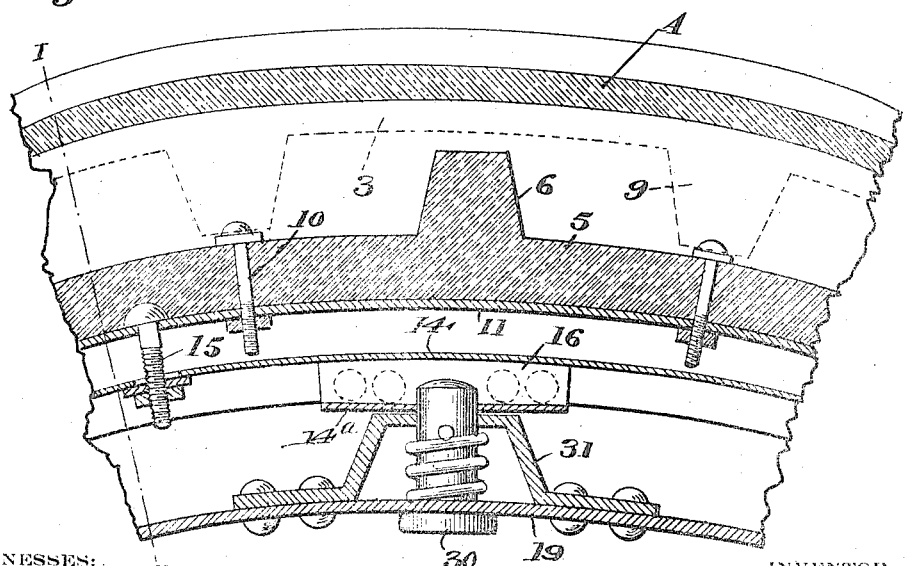
Fig. 2 is a longitudinal section on line 2—2, Fig. 1.

The inner core tire preferably constructed of rubber, forms a continuous flexible cushion for the outer casing and the side sections 3—4 together with the tubular rings 13 form fillers to reshape the outer casing and also to maintain the sides of the casing in extended position. The inner ring 14 is preferably split at one point and the perforations through which the bolts 15 pass are preferably elongated as shown in Fig. 2 to permit a slight adjustment and drawing together of the ring when it is bolted to the core tire and ring 11.

The materials and finish of the core tire and the coöperating parts may be such as the experience and judgment of the manufacturer may dictate.

I wish it understood that various changes in form, proportion and minor details of construction may be resorted to within the scope of the appended claims, and that I do not wish to limit myself to the specific design and construction here shown.

Having thus described my invention, what I claim and desire to secure by Letters Patent is—

1. A tire core comprising two connected flexible ring members, said ring members being L-shaped in cross section, and separated to form an annular exterior channel and a plurality of interspaced webs extending across said channel.

2. The combination with a tire casing of a resilient filler ring mounted interior of the casing, said ring in cross-section resembling two connected inverted L-shaped members, a metal ring secured interior of said resilient filler ring, an outwardly turned rounded flange formed on each side of the metal ring, a tubular ring interposed between each of said flanges and the sides of the casing adapted to keep said sides extended and also adapted to support the outer edges of the resilient filler ring, and means for securing the clencher beads of the casing against the inner surface of the metal ring.

3. The combination with a tire casing of a resilient filler ring mounted interior of the casing, said ring in cross-section resembling two connected inverted L-shaped members, a metal ring secured interior of said resilient filler ring, an outwardly turned rounded flange formed on each side of the metal ring, a tubular ring interposed between each of said flanges and the sides of the casing adapted to keep said sides extended and also adapted to support the outer edges of the resilient filler ring, cross slits formed in the clencher beads of the casing, perforations formed in the sides of the casing, and a plurality of lacing strings adapted to be threaded through the perforated sections to draw the clencher beads of the casing in under the metal ring.

4. The combination with a tire casing of a resilient filler ring mounted interior of the casing, said ring in cross-section resembling two connected inverted L-shaped members, a metal ring secured interior of said resilient filler ring, an outwardly turned rounded flange formed on each side of the metal ring, a tubular ring interposed between each of said flanges and the sides of the casing adapted to keep said sides extended and also adapted to support the outer edges of the resilient filler ring, means for temporarily drawing the clencher beads in under the metal ring, and a clamping ring adapted to engage and permanently secure the clencher beads against the inner surface of the metal ring.

5. The combination with a tire casing of a resilient filler ring mounted interior of the casing, said ring in cross-section resembling two connected inverted L-shaped members, a metal ring secured interior of said resilient filler ring, an outwardly turned rounded flange formed on each side of the metal ring, a tubular ring interposed between each of said flanges and the sides of the casing adapted to keep said sides extended and also adapted to support the outer edges of the resilient filler ring, means for temporarily drawing the clencher beads in under the metal ring, a clamping ring adapted to engage and permanently secure the clencher beads against the inner surface of the metal ring, and means for securing the clamping ring to the felly of a wheel.

6. In a rubber tire casing support, a resilient filler ring within the casing, said ring in cross section resembling two connected inverted L-shaped members, a rigid ring with upturned flanges upon its opposite edges forming supports for the inner central edge of the first-named ring and for the clencher beads, a circumferentially channeled ring centrally secured to said flanged ring to clamp the opposite edges of the casing beads, and flexible tubular rings retained within the casing and between the flanged ring and the casing.

7. The combination with a wheel rim and a rubber tire casing of a resilient filler ring within the casing, said ring in cross section resembling two connected, inverted L-shaped members, a rigid ring with upturned flanges upon its opposite edges forming supports for the inner central edge of the first-named ring and for the clencher beads, a circumferentially channeled ring centrally secured to said flanged ring to clamp the opposite edges of the casing beads, flexible tubular rings retained within the casing and between the flanged ring and the casing, and means for securing the tire casing support to the wheel rim.

In testimony whereof I have hereunto set my hand in the presence of two subscribing witnesses.

JAMES SEADLER.

Witnesses:
RUTH FIELDS,
C. F. METTEER.

Copies of this patent may be obtained for five cents each, by addressing the "Commissioner of Patents, Washington, D. C."